United States Patent
Faraboschi et al.

(10) Patent No.: US 6,829,700 B2
(45) Date of Patent: Dec. 7, 2004

(54) CIRCUIT AND METHOD FOR SUPPORTING MISALIGNED ACCESSES IN THE PRESENCE OF SPECULATIVE LOAD INSTRUCTIONS

(75) Inventors: Paolo Faraboschi, Brighton, MA (US); Alexander J. Starr, Acton, MA (US); Geoffrey M. Brown, Watertown, MA (US); Mark Owen Homewood, Winscombe (GB)

(73) Assignees: STMicroelectronics, Inc., Carrollton, TX (US); Hewlett-Packard Company, Palo Alto, CA (US)

( * ) Notice: Subject to any disclaimer, the term of this patent is extended or adjusted under 35 U.S.C. 154(b) by 714 days.

(21) Appl. No.: 09/751,327

(22) Filed: Dec. 29, 2000

(65) Prior Publication Data

US 2002/0087841 A1 Jul. 4, 2002

(51) Int. Cl.[7] .............................................. G06F 9/312
(52) U.S. Cl. ...................................... 712/225; 712/219
(58) Field of Search .................................. 712/225, 219

(56) References Cited

U.S. PATENT DOCUMENTS 5,201,043 A * 4/1993 Crawford et al. ............ 714/49
5,915,117 A * 6/1999 Ross et al. ................... 710/262

* cited by examiner

*Primary Examiner*—Richard L. Ellis
(74) *Attorney, Agent, or Firm*—Lisa K. Jorgenson; William A. Munck

(57) ABSTRACT

There is disclosed a data processor comprising: 1) an instruction execution pipeline comprising N processing stages for executing a load instruction; 2) a status register for storing a modifiable configuration value, the modifiable configuration value having a first value indicating the data processor is capable of executing a misaligned access handling routine and a second value indicating the data processor is not capable of executing a misaligned access handling routine; 3) a misalignment detection circuit for determining if the load instruction performs a misaligned access to a target address of the load instruction and, in response to a determination that the load instruction does perform a misaligned access, generating a misalignment flag; and 4) exception control circuitry capable of detecting the misalignment flag and in response thereto determining if the modifiable configuration value is equal to the first value.

21 Claims, 4 Drawing Sheets

CIRCUIT AND METHOD FOR SUPPORTING MISALIGNED ACCESSES IN THE PRESENCE OF SPECULATIVE LOAD INSTRUCTIONS

CROSS-REFERENCE TO RELATED APPLICATIONS

The present invention is related to those disclosed in the following United States Patent Applications:

1) Ser. No. 09/751,372, filed concurrently herewith, entitled "SYSTEM AND METHOD FOR EXECUTING VARIABLE LATENCY LOAD OPERATIONS IN A DATA PROCESSOR";
2) Ser. No. 09/751,331, filed concurrently herewith, entitled "PROCESSOR PIPELINE STALL APPARATUS AND METHOD OF OPERATION";
3) Ser. No. 09/751,371, now U.S. Pat. No. 6,691,210, filed concurrently herewith, entitled "CIRCUIT AND METHOD FOR HARDWARE-ASSISTED SOFTWARE FLUSHING OF DATA AND INSTRUCTION CACHES";
4) Ser. No. 09/751,377, filed concurrently herewith, entitled "BYPASS CIRCUITRY FOR USE IN A PIPELINED PROCESSOR";
5) Ser. No. 09/751,410, filed concurrently herewith, entitled "SYSTEM AND METHOD FOR EXECUTING CONDITIONAL BRANCH INSTRUCTIONS IN A DATA PROCESSOR";
6) Ser. No. 09/751,408, filed concurrently herewith, entitled "SYSTEM AND METHOD FOR ENCODING CONSTANT OPERANDS IN A WIDE ISSUE PROCESSOR";
7) Ser. No. 09/751,330, filed concurrently herewith, entitled "SYSTEM AND METHOD FOR SUPPORTING PRECISE EXCEPTIONS IN A DATA PROCESSOR HAVING A CLUSTERED ARCHITECTURE";
8) Ser. No. 09/751,674, filed concurrently herewith, entitled "CIRCUIT AND METHOD FOR INSTRUCTION COMPRESSION AND DISPERSAL IN WIDE-ISSUE PROCESSORS";
9) Ser. No. 09/751,678, filed concurrently herewith, entitled "SYSTEM AND METHOD FOR REDUCING POWER CONSUMPTION IN A DATA PROCESSOR HAVING A CLUSTERED ARCHITECTURE"; and
10) Ser. No. 09/751,679, filed concurrently herewith, entitled "INSTRUCTION FETCH APPARATUS FOR WIDE ISSUE PROCESSORS AND METHOD OF OPERATION".

The above applications are commonly assigned to the assignee of the present invention. The disclosures of these related patent applications are hereby incorporated by reference for all purposes as if fully set forth herein.

TECHNICAL FIELD OF THE INVENTION

The present invention is generally directed to data processors and, more specifically, to an apparatus for supporting misaligned accesses in a data processor in the presence of speculative load instructions.

BACKGROUND OF THE INVENTION

The demand for high performance computers requires that state-of-the-art microprocessors execute instructions in the minimum amount of time. A number of different approaches have been taken to decrease instruction execution time, thereby increasing processor throughput. One way to increase processor throughput is to use a pipeline architecture in which the processor is divided into separate processing stages that form the pipeline. Instructions are broken down into elemental steps that are executed in different stages in an assembly line fashion.

A pipelined processor is capable of executing several different machine instructions concurrently. This is accomplished by breaking down the processing steps for each instruction into several discrete processing phases, each of which is executed by a separate pipeline stage. Hence, each instruction must pass sequentially through each pipeline stage in order to complete its execution. In general, a given instruction is processed by only one pipeline stage at a time, with one clock cycle being required for each stage. Since instructions use the pipeline stages in the same order and typically only stay in each stage for a single clock cycle, an N stage pipeline is capable of simultaneously processing N instructions. When filled with instructions, a processor with N pipeline stages completes one instruction each clock cycle.

The execution rate of an N-stage pipeline processor is theoretically N times faster than an equivalent non-pipelined processor. A non-pipelined processor is a processor that completes execution of one instruction before proceeding to the next instruction. Typically, pipeline overheads and other factors decrease somewhat the execution rate advantage that a pipelined processor has over a non-pipelined processor.

An exemplary seven stage processor pipeline may consist of an address generation stage, an instruction fetch stage, a decode stage, a read stage, a pair of execution (E1 and E2) stages, and a write (or write-back) stage. In addition, the processor may have an instruction cache that stores program instructions for execution, a data cache that temporarily stores data operands that otherwise are stored in processor memory, and a register file that also temporarily stores data operands.

The address generation stage generates the address of the next instruction to be fetched from the instruction cache. The instruction fetch stage fetches an instruction for execution from the instruction cache and stores the fetched instruction in an instruction buffer. The decode stage takes the instruction from the instruction buffer and decodes the instruction into a set of signals that can be directly used for executing subsequent pipeline stages. The read stage fetches required operands from the data cache or registers in the register file. The E1 and E2 stages perform the actual program operation (e.g., add, multiply, divide, and the like) on the operands fetched by the read stage and generates the result. The write stage then writes the result generated by the E1 and E2 stages back into the data cache or the register file.

Assuming that each pipeline stage completes its operation in one clock cycle, the exemplary seven stage processor pipeline takes seven clock cycles to process one instruction. As previously described, once the pipeline is full, an instruction can theoretically be completed every clock cycle.

The throughput of a processor also is affected by the size of the instruction set executed by the processor and the resulting complexity of the instruction decoder. Large instruction sets require large, complex decoders in order to maintain a high processor throughput. However, large complex decoders tend to increase power dissipation, die size and the cost of the processor. The throughput of a processor also may be affected by other factors, such as exception handling, data and instruction cache sizes, multiple parallel instruction pipelines, and the like. All of these factors increase or at least maintain processor throughput by means of complex and/or redundant circuitry that simultaneously increases power dissipation, die size and cost.

In many processor applications, the increased cost, increased power dissipation, and increased die size are tolerable, such as in personal computers and network servers that use x86-based processors. These types of processors include, for example, Intel Pentium™ processors and AMD Athlon™ processors.

However, in many applications it is essential to minimize the size, cost, and power requirements of a data processor. This has led to the development of processors that are optimized to meet particular size, cost and/or power limits. For example, the recently developed Transmeta Crusoe™ processor greatly reduces the amount of power consumed by the processor when executing most x86 based programs. This is particularly useful in laptop computer applications. Other types of data processors may be optimized for use in consumer appliances (e.g., televisions, video players, radios, digital music players, and the like) and office equipment (e.g., printers, copiers, fax machines, telephone systems, and other peripheral devices). The general design objectives for data processors used in consumer appliances and office equipment are the minimization of cost and complexity of the data processor.

Explicit speculative load instructions are an important tool in achieving high instruction level parallelism for wide instruction word processors. Speculative load instructions differ from conventional load instructions only in situations where a conventional load instruction would cause an exception. In most cases, the speculative load instruction would not cause an exception and a separate software test must be performed to determined if the loaded data is valid. This characteristic allows speculative load instructions to be performed sooner than strict program order permits thereby enabling higher parallelism. A special case arises in processors that do not provide hardware support of misaligned access of data because some code depends upon the ability to perform misaligned accesses. In such cases, misaligned loads are supported through software exception handlers.

Pure software solutions are the simplest solutions for supporting code requiring misaligned accesses in processors that do not have hardware to implement misaligned accesses. At one extreme, the compiler can be instructed not to use speculative loads in critical sections of code. This solution has the disadvantage of discarding any parallelism that might be gained from the use of speculative load instructions. At the other extreme, the compiler can introduce additional tests and recovery code to ensure that where speculative loads are used on misaligned data, the (incorrect) loaded data is not used in subsequent phases of the program. This second solution requires significant additional code that might severely limit the performance advantages of using speculative load instructions in the first place.

Existing hardware solutions are aimed at providing efficient support for test and recovery. For example, the IA64 provides an additional bit associated with each register, which may be set by a speculative load instruction when the accessed data is incorrect. A hardware check instruction is provided to test this bit and invoke appropriate recovery code. The principal disadvantage to this approach is the requirement to implement additional program state in the form of these bits as well as instructions for saving and restoring this state.

Perhaps the most significant drawback to any of these prior art solutions is the fact that these solutions are too rigid. Each solution either allows hardware recovery of misaligned accesses or it does not allow such hardware recovery. Designers of system-on-chip products do not have the choice of the level of support of misaligned accesses.

Therefore, there is a need in the art for improved exception handling techniques in the presence of speculative load instructions. In particular, there is a need for data processors that provide improved handling of misaligned accesses in the case of speculative (or dismissible) load instructions. More particularly, there is a need for data processors that provide embedded system designers with some flexibility in handling misaligned accesses in the case of dismissible load instructions.

SUMMARY OF THE INVENTION

The present invention provides a compromise between hardware and software solutions. In particular, the present invention provides the option, under software control, to enable exceptions for misaligned accesses caused by speculative load instructions. A bit is provided in the program status word (PSW) that selectively enables or disables misaligned access exceptions for speculative loads. Other sources of excepting behavior for speculative loads are ignored. Thus, software requiring misaligned accesses can be supported in the presence of speculative loads by implementing an appropriate exception handler.

To address the above-discussed deficiencies of the prior art, it is a primary object of the present invention to provide, according to an advantageous embodiment of the present invention, a data processor comprising: 1) an instruction execution pipeline comprising N processing stages capable of executing a load instruction; 2) a status register capable of storing a modifiable configuration value, the modifiable configuration value having a first value indicating the data processor is capable of executing a misaligned access handling routine and a second value indicating the data processor is not capable of executing a misaligned access handling routine; 3) a misalignment detection circuit capable of determining if the load instruction performs a misaligned access to a target address of the load instruction and, in response to a determination that the load instruction does perform a misaligned access, generating a misalignment flag; and 4) exception control circuitry capable of detecting the misalignment flag and in response thereto determining if the modifiable configuration value is equal to the first value.

According to one embodiment of the present invention, the exception control circuitry, in response to a determination that the modifiable configuration value is equal to the first value, causes the data processor to execute the misaligned access handling routine.

According to another embodiment of the present invention, the exception control circuitry, in response to a determination that the modifiable configuration value is equal to the second value, determines if the load instruction is speculative.

According to still another embodiment of the present invention, the exception control circuitry, in response to a determination that the load instruction is speculative, causes the data processor to dismiss the load instruction.

According to yet another embodiment of the present invention, the data processor further comprises a data protection unit capable of determining if the load instruction accesses a restricted area of memory.

According to a further embodiment of the present invention, the data protection unit, in response to a determination that the load instruction does access a restricted area of memory, causes the data processor to execute an exception handling routine.

According to a yet further embodiment of the present invention, the data protection unit, in response to a determination that the load instruction does access a restricted area of memory, is further capable of determining if the load instruction is speculative.

According to a still further embodiment of the present invention, the exception control circuitry, in response to a determination that the load instruction is speculative, causes the data processor to dismiss the load instruction.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged data processor.

Figure 1:
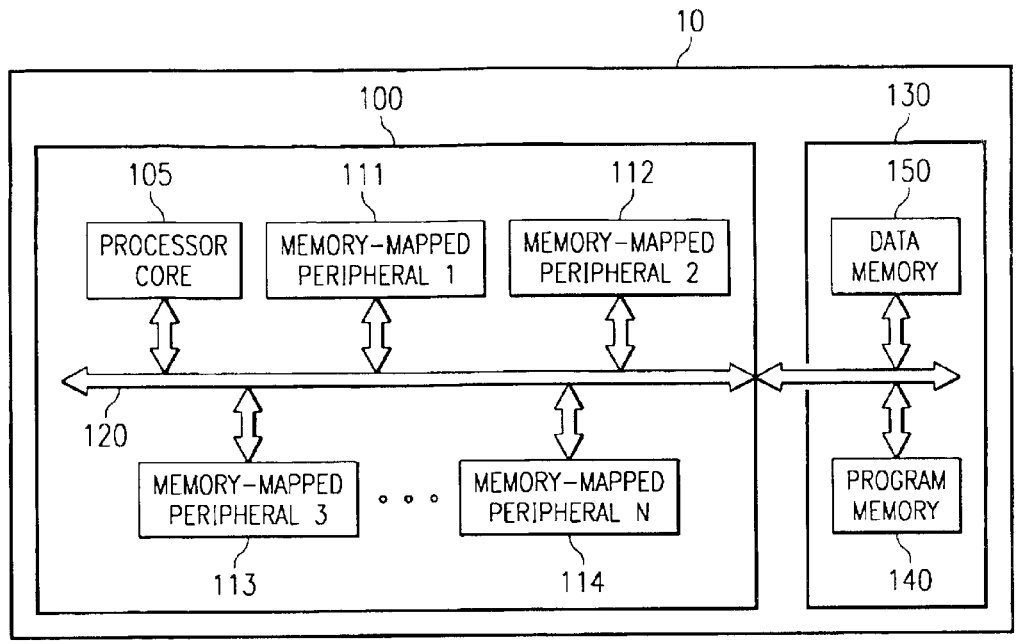
FIG. 1 is a block diagram of a processing system that contains a data processor in accordance with the principles of the present invention.

FIG. 1 is a block diagram of processing system 10, which contains data processor 100 in accordance with the principles of the present invention. Data processor 100 comprises processor core 105 and N memory-mapped peripherals interconnected by system bus 120. The N memory-mapped peripherals include exemplary memory-mapped peripherals 111–114, which are arbitrarily labeled Memory-Mapped Peripheral 1, Memory-Mapped Peripheral 2, Memory-Mapped Peripheral 3, and Memory-Mapped Peripheral N. Processing system 10 also comprises main memory 130. In an advantageous embodiment of the present invention, main memory 130 may be subdivided into program memory 140 and data memory 150.

The cost and complexity of data processor 100 is minimized by excluding from processor core 105 complex functions that may be implemented by one or more of memory-mapped peripherals 111–114.

For example, memory-mapped peripheral 111 may be a video codec and memory-mapped peripheral 112 may be an audio codec. Similarly, memory-mapped peripheral 113 may be used to control cache flushing. The cost and complexity of data processor 100 is further minimized by implementing extremely simple exception behavior in processor core 105, as explained below in greater detail.

Processing system 10 is shown in a general level of detail because it is intended to represent any one of a wide variety of electronic devices, particularly consumer appliances. For example, processing system 10 may be a printer rendering system for use in a conventional laser printer. Processing system 10 also may represent selected portions of the video and audio compression-decompression circuitry of a video playback system, such as a video cassette recorder or a digital versatile disk (DVD) player. In another alternative embodiment, processing system 10 may comprise selected portions of a cable television set-top box or a stereo receiver. The memory-mapped peripherals and a simplified processor core reduce the cost of data processor 100 so that it may be used in such price sensitive consumer appliances.

In the illustrated embodiment, memory-mapped peripherals 111–114 are shown disposed within data processor 100 and program memory 140 and data memory 150 are shown external to data processor 100. It will be appreciated by those skilled in the art that this particular configuration is shown by way of illustration only and should not be construed so as to limit the scope of the present invention in any way. In alternative embodiments of the present invention, one or more of memory-mapped peripherals 111–114 may be externally coupled to data processor 100. Similarly, in another embodiment of the present invention, one or both of program memory 140 and data memory 150 may be disposed on-chip in data processor 100.

Figure 2:
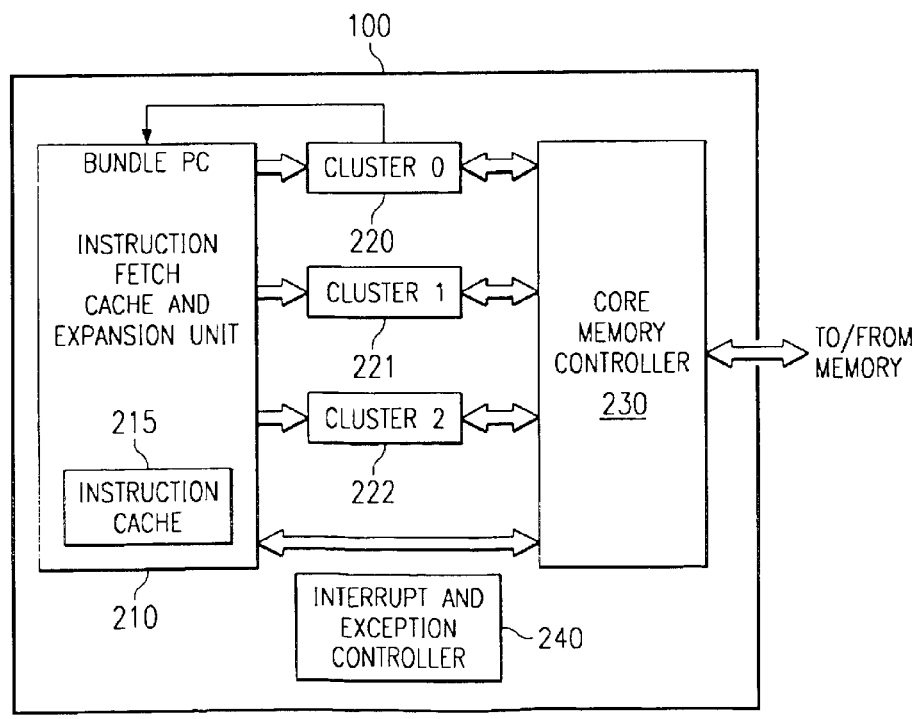
FIG. 2 illustrates the exemplary data processor in greater detail according to one embodiment of the present invention.

FIG. 2 is a more detailed block diagram of exemplary data processor 100 according to one embodiment of the present invention. Data processor 100 comprises instruction fetch cache and expansion unit (IFCEXU) 210, which contains instruction cache 215, and a plurality of clusters, including exemplary clusters 220–222. Exemplary clusters 220–222 are labeled Cluster 0, Cluster 1 and Cluster 2, respectively. Data processor 100 also comprises core memory controller 230 and interrupt and exception controller 240.

A fundamental object of the design of data processor 100 is to exclude from the core of data processor 100 most of the functions that can be implemented using memory-mapped peripherals external to the core of data processor 100. By way of example, in an exemplary embodiment of the present invention, cache flushing may be efficiently accomplished using software in conjunction with a small memory-mapped device. Another object of the design of data processor 100 is to implement a statically scheduled instruction pipeline with an extremely simple exception behavior.

Clusters 220–222 are basic execution units that comprise one more arithmetic units, a register file, an interface to core memory controller 230, including a data cache, and an inter-cluster communication interface. In an exemplary embodiment of the present invention, the core of data processor 100 may comprise only a single cluster, such as exemplary cluster 220.

Because conventional processor cores can execute multiple simultaneously issued operations, the traditional word "instruction" is hereby defined with greater specificity. For the purposes of this disclosure, the following terminology is adopted. An "instruction" or "instruction bundle" is a group of simultaneously issued operations encoded as "instruction syllables". Each instruction syllable is encoded as a single machine word. Each of the operations constituting an instruction bundle may be encoded as one or more instruction syllables. Hereafter, the present disclosure may use the shortened forms "instruction" and "bundle" interchangeably and may use the shortened form "syllable." In an exemplary embodiment of the present invention, each instruction bundle consists of 1 to 4 instruction syllables. Flow control operations, such as branch or call, are encoded in single instruction syllables.

Figure 3:
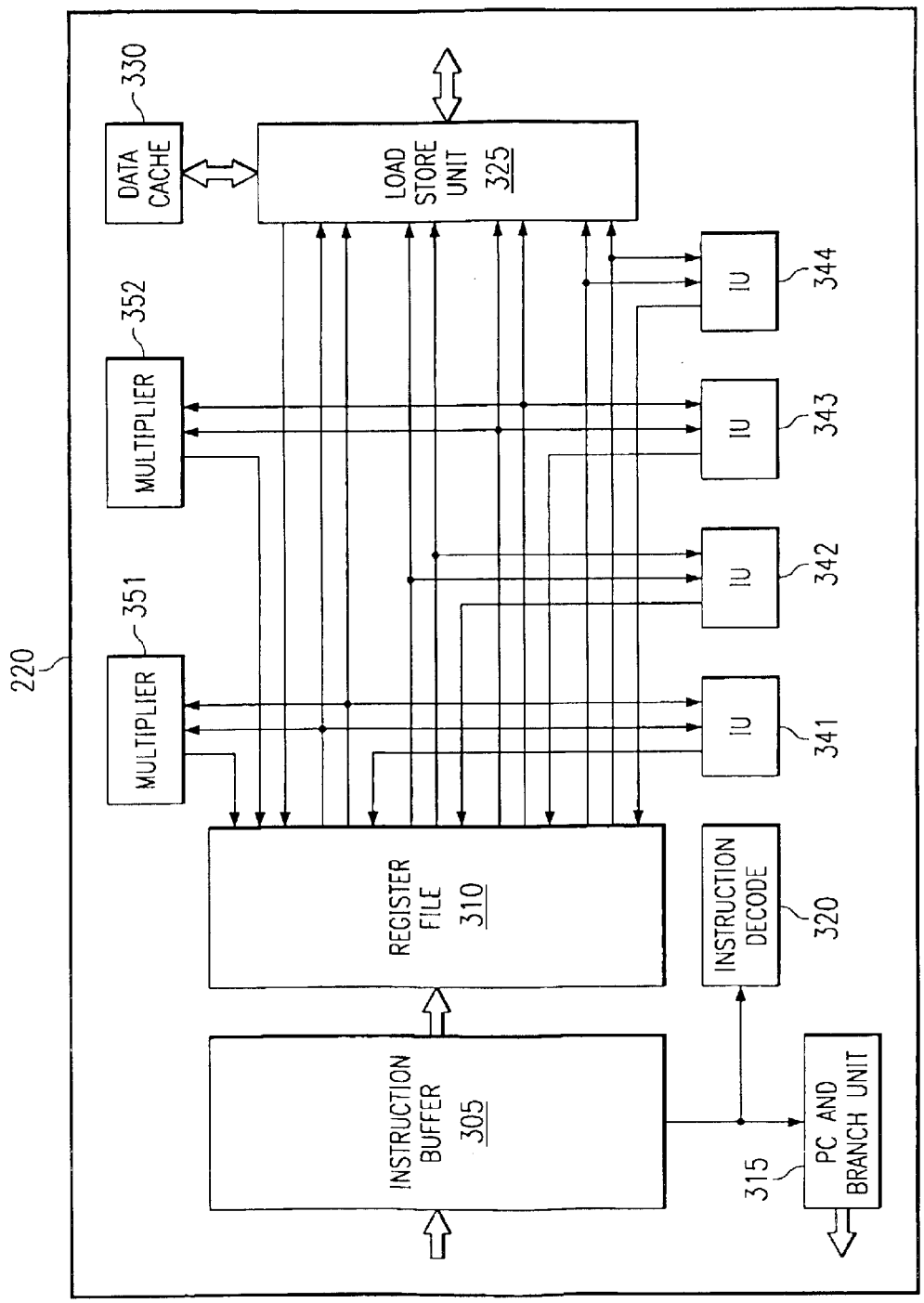
FIG. 3 illustrates a cluster in the exemplary data processor according to one embodiment of the present invention.

FIG. 3 is a more detailed block diagram of cluster 220 in data processor 100 according to one embodiment of the present invention. Cluster 220 comprises instruction buffer 305, register file 310, program counter (PC) and branch unit 315, instruction decoder 320, load store unit 325, data cache 330, integer units 341–344, and multipliers 351–352. Cluster 220 is implemented as an instruction pipeline.

Instructions are issued to an operand read stage associated with register file 310 and then propagated to the execution units (i.e., integer units 341–244, multipliers 351–352). Cluster 220 accepts one bundle comprising one to four syllables in each cycle. The bundle may consist of any combination of four integer operations, two multiplication operations, one memory operation (i.e., read or write) and one branch operation. Operations that require long immediates (constants) require two syllables.

In specifying a cluster, it is assumed that no instruction bits are used to associate operations with functional units. For example, arithmetic or load/store operations may be placed in any of the four words encoding the operations for a single cycle. This may require imposing some addressing alignment restrictions on multiply operations and long immediates (constants).

This following describes the architectural (programmer visible) status of the core of data processor 100. One design objective of data processor 100 is to minimize the architectural status. All non-user visible status information resides in a memory map, in order to reduce the number of special instructions required to access such information.

Program Counter

In an exemplary embodiment of the present invention, the program counter (PC) in program counter and branch unit 315 is a 32-bit byte address pointing to the beginning of the current instruction bundle in memory. The two least significant bits (LSBs) of the program counter are always zero. In operations that assign a value to the program counter, the two LSBs of the assigned value are ignored.

Register File 310

In an exemplary embodiment, register file 310 contains 64 words of 32 bits each. Reading Register 0 (i.e., R0) always returns the value zero.

Link Register

Register 63 (i.e., R63) is used to address the link register by the call and return instructions. The link register (LR) is a slaved copy of the architecturally most recent update to R63. R63 can be used as a normal register, between call and return instructions. The link register is updated only by writes to R63 and the call instruction. At times the fact that the link register is a copy of R63 and not R63 itself may be visible to the programmer. This is because the link register and R63 get updated at different times in the pipeline. Typically, this occurs in the following cases:

1) ICALL and IGOTO instructions—Since these instructions are executed in the decode stage, these operations require that R63 be stable. Thus, R63 must not be modified in the instruction bundle preceding one of these operations. Otherwise unpredictable results may occur in the event of an interrupt; and 2) An interrupt or exception may update the link register incorrectly. Thus, all interrupt and exception handlers must explicitly write R63 prior to using the link register through the execution of an RFI, ICALL or IGOTO instruction. This requirement can be met with a simple MOV instruction from R63 to R63.

Branch Bit File

The branch architecture of data processor 100 uses a set of eight (8) branch bit registers (i.e., B0 through B7) that may be read or written independently. In an exemplary embodiment of the present invention, data processor 100 requires at least one instruction to be executed between writing a branch bit and using the result in a conditional branch operation.

Control Registers

A small number of memory mapped control registers are part of the architectural state of data processor 100. These registers include support for interrupts and exceptions, and memory protection.

The core of data processor 100 is implemented as a pipeline that requires minimal instruction decoding in the early pipeline stages. One design objective of the pipeline of data processor 100 is that it support precise interrupts and exceptions. Data processor 100 meets this objective by updating architecturally visible state information only during a single write stage. To accomplish this, data processor 100 makes extensive use of register bypassing circuitry to minimize the performance impact of meeting this requirement.

Figure 4:
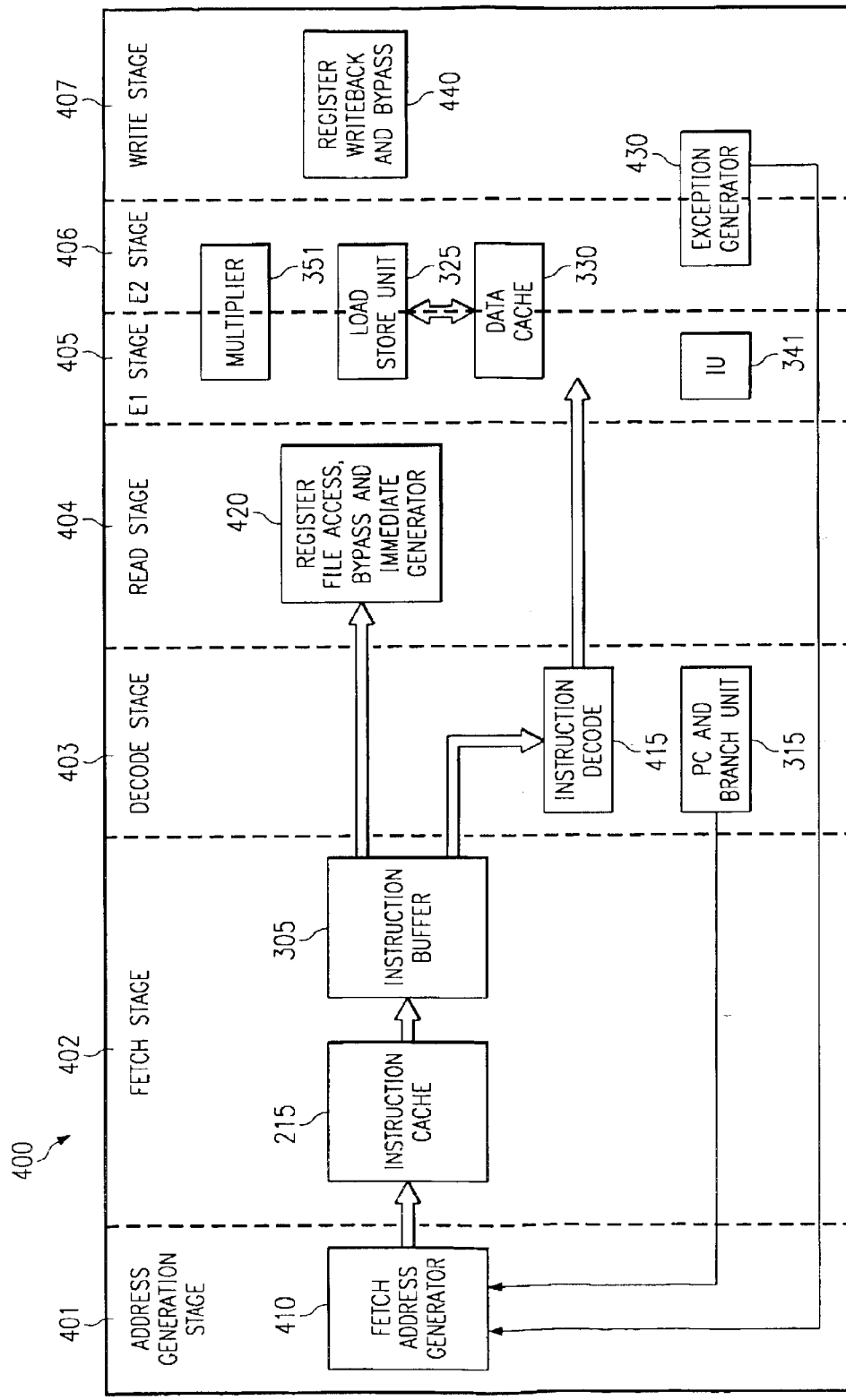
FIG. 4 illustrates the operational stages of the exemplary data processor according to one embodiment of the present invention.

FIG. 4 is a block diagram illustrating the operational stages of pipeline 400 in exemplary data processor 100 according to one embodiment of the present invention. In the illustrated embodiment, the operational stages of data processor 100 are address generation stage 401, fetch stage 402, decode stage 403, read stage 404, first execution (E1) stage 405, second execution (E2) stage 406 and write stage 407.

Address Generation Stage 401 and Fetch Stage 402

Address generation stage 401 comprises a fetch address generator 410 that generates the address of the next instruction to be fetched from instruction cache 215. Fetch address generator 410 receives inputs from exception generator 430 and program counter and branch unit 315. Fetch address generator 410 generates an instruction fetch address (FADDR) that is applied to instruction cache 215 in fetch stage 402 and to an instruction protection unit (not shown) that generates an exception if a protection violation is found. Any exception generated in fetch stage 402 is postponed to write stage 407. Instruction buffer 305 in fetch stage 402 receives instructions as 128-bit wide words from instruction cache 215 and the instructions are dispatched to the cluster.

Decode Stage 403

Decode stage 403 comprises instruction decode block 415 and program counter (PC) and branch unit 315. Instruction decode block 415 receives instructions from instruction buffer 305 and decodes the instructions into a group of control signals that are applied to the execution units in E1 stage 405 and E2 stage 406. Program counter and branch unit 315 evaluates branches detected within the 128-bit wide words. A taken branch incurs a one cycle delay and the instruction being incorrectly fetched while the branch instruction is evaluated is discarded.

Read Stage 404

In read stage 404, operands are generated by register file access, bypass and immediate (constant) generation block 420. The sources for operands are the register files, the constants (immediates) assembled from the instruction bundle, and any results bypassed from operations in later stages in the instruction pipeline.

E1 Stage 405 and E2 Stage 406

The instruction execution phase of data processor 100 is implemented as two stages, E1 stage 405 and E2 stage 406 to allow two cycle cache access operations and two cycle multiplication operations. Exemplary multiplier 351 is illustrated straddling the boundary between E1 stage 405 and E2 stage 406 to indicate a two cycle multiplication operation. Similarly, load store unit 325 and data cache 330 are illustrated straddling the boundary between E1 stage 405 and E2 stage 406 to indicate a two cycle cache access operation. Integer operations are performed by integer units, such as IU 341 in E1 stage 405. Exceptions are generated by exception generator 430 in E2 stage 406 and write stage 407.

Results from fast operations are made available after E1 stage 405 through register bypassing operations. An important architectural requirement of data processor 100 is that if the results of an operation may be ready after E1 stage 405, then the results are always ready after E1 stage 405. In this manner, the visible latency of operations in data processor 100 is fixed.

Write Stage 407

At the start of write stage 407, any pending exceptions are raised and, if no exceptions are raised, results are written by register write back and bypass block 440 into the appropriate register file and/or data cache location. In data processor 100, write stage 407 is the "commit point" and operations reaching write stage 407 in the instruction pipeline and not "excepted" are considered completed. Previous stages (i.e., address generation, fetch, decode, read, E1, E2) are temporally prior to the commit point. Therefore, operations in address generation stage 401, fetch stage 402, decode stage 403, read stage 404, E1 stage 405 and E2 stage 406 are flushed when an exception occurs and are acted upon in write stage 407.

According to an advantageous embodiment of the present invention, data processor 100 is capable of supporting speculative loads in order to maximize the level of parallelism in data processor 100. For example, the program sequence:

Ex. A: if (i<100)
   a=b[i]
may be complied as the instructions:
Ex. B: t=b*[i]
if (i<100)

The instruction a=b[i] is a normal Load Word (LDW) instruction. If the value of i is such that a=b[i] causes data to be read from an area of memory that is not mapped by data processor 100, an exception occurs when the instruction a=b(i) is executed.

However, the instruction t=b*[i] is an explicit speculative (or dismissible) Load Word (LDW.d) instruction that may be executed by data processor 100 before the condition "if (i<100)" is evaluated. If the value of i is such that t=b*[i] causes data to be read from an area of memory that is not mapped by data processor 100, the execution would not be detected until after t=b*[i] has been executed. When an exception occurs, the next instruction which is allowed to execute is the first operation in the exception handler.

Likewise, if a load operation is misaligned on half word or word boundaries, an exception occurs. For example, if a properly aligned Load Half Word operation loads two syllables (i.e., a half word) aligned on even boundaries, the accessed data location ends with the two least significant address bits A[1:0]=x0. Thus, a Load Half Word operation to an odd address (i.e., A[1:0]=x1) causes an exception. Similarly, if a properly aligned Load Word operation loads four syllables (i.e., a word) from 128-bit cache lines aligned on multiple-of-four boundaries, the accessed data location ends with the address bits A[1:0]=00. Thus, a Load Word operation to an address ending with A[1:0]=x1 or A[1:0]=10 causes an exception.

Depending on the type of implementation, the system in which data processor 100 is used, particularly an embedded system, may or may not provide support for exceptions caused by misaligned loads. As is obvious from the foregoing description, there are two exception types. The first exception type is a protection fault in which a speculative load accesses an area of memory that is not mapped. This is non-recoverable, but the load operation may be dismissed if it is speculative with no penalty. The second exception type is a misalignment exception, which provides two options. The first option is to provide hardware or software to recover misaligned accesses, if possible. The second option is to dismiss the load if it is speculative and no hardware or software is provided to recover misaligned accesses. Data processor 100 provides the unique capability to the end-user to modify the behavior of data processor 100 after a misalignment exception by changing the value of a data field (e.g., one or more status bits) in the program status word.

Figure 5:
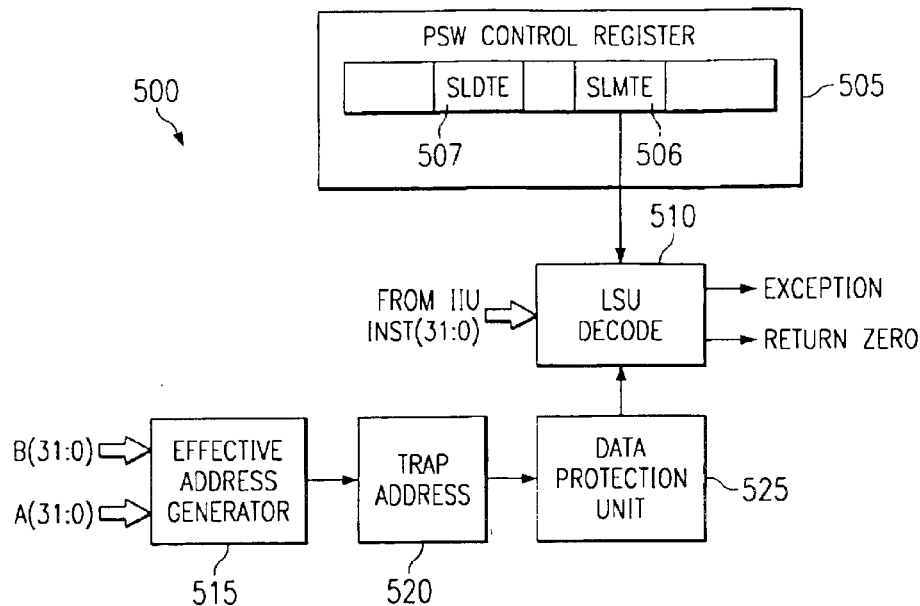
FIG. 5 illustrates exception handling circuitry in the data processor that detects and handles misaligned accesses and other exceptions according to one embodiment of the present invention.

FIG. 5 illustrates exception handling circuitry, generally designated 500, in data processor 100 that detects and handles misaligned accesses and other exceptions according to one embodiment of the present invention. Exception handling circuitry 500 comprises program status word (PSW) control register 505, load store unit decode block 510, effective address generator 515, trap address block 520 and data protection unit 525. PSW control register 505 further comprises speculative load misalignment trap enabled (SLMTE) bit 506 and speculative load data protection unit (DPU) trap enabled (SLDTE) bit 506.

Registers contained within the data protection units, such as data protection units 425, are memory mapped into the control register space. This allows normal reading and writing of these registers to be done by normal load and store instructions. The enabling and disabling of the data protection units is done by SLMTE bit 506 and SLDTE bit 507 in PSW control register 505. The data protection units, such as data protection unit 525, provide control for a number of regions of memory that have certain property information associated with them.

Effective address generator 515 determines the effective address of the load operation by adding, for example, a base address A[31:0] and an offset address, B[31:0], to thereby produce an effective address (EA). The effective address is captured by trap address block 520 and transferred to data protection unit 525. Data protection unit 525 compares the effective address to the address spaces of mapped memory areas to determine whether or not the load operation accesses an unmapped location. If it does, error codes are transmitted to LSU decode block 510, which receives instruction bits I{31:0} from the instruction issue unit (IIU).

In certain cases, normal loads should return the data as expected, but speculative loads to the same location return a zero without doing a memory access. This is because a read operation to the area of memory may destroy the data at that location. Typically, this would be performed by some kind of memory-mapped peripheral. If the bit for the region is set in the attribute registers, LSU decode block 510 in load store unit 325 returns zero as data and does not make a memory request. Accordingly, LSU decode block 510 generates the signals EXCEPTION and RETURN ZERO for use in exception handling routines and flushing pipeline 400.

Figure 6:
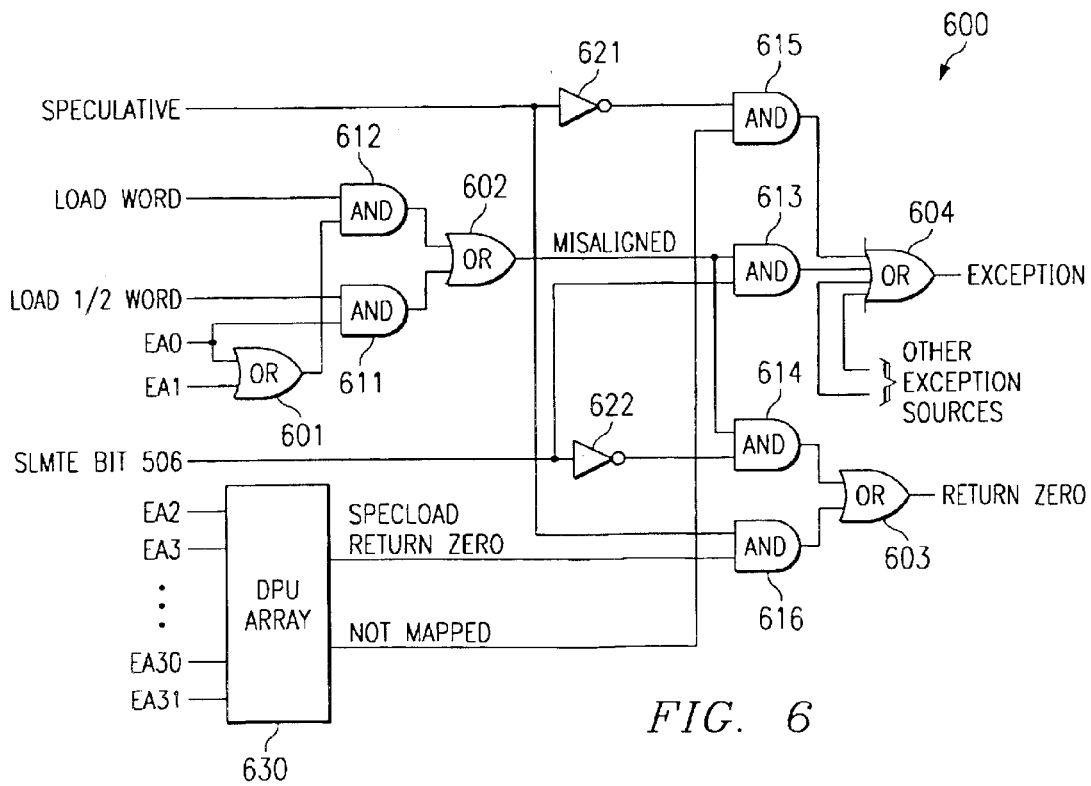
FIG. 6 illustrates in greater detail selected portions of the exception handling circuitry according to one embodiment of the present invention.

Exceptions can be generated from a number of sources within data processor 100. Load store unit 325 controls the global exception signal, which indicates that an exception has occurred. FIG. 6 illustrates in greater detail exception and misaligned control circuitry, generally designated 600, in exception handling circuitry 500 according to one embodiment of the present invention. Exception and misaligned control circuitry 500 comprises OR gates 601–604, AND gates 611–616, and inverters 621–622. Exception and misaligned control circuitry 500 also comprises data protection unit (DPU) array 630.

LSU decode block 510 determines from INST[31:0] if the load instruction is speculative and sets the signal SPECULATIVE to Logic 1 if so. LSU decode block 510 determines from INST[31:0] if the instruction is a Load Word or Load Half Word operation and sets the signals LOAD WORD and LOAD HALF WORD to Logic 1 is so. OR gates 601 and 602 and AND gates 611 and 612 determine from the LOAD WORD and LOAD HALF WORD signals and the two least significant effective address bits, EA1 and EA0, whether a misaligned load has occurred. It a misaligned load has occurred, the MISALIGNED signal on the output of OR gate 602 is set to Logic 1.

As noted above, data processor 100 treats speculative loads differently in some respects than normal loads. Notably, if a speculative load causes an exception, data processor 100 does not always initiate an exception. The choice whether or not to initiate an exception is determined by the values of Speculative Load Misaligned Trap Enabled (SLMTE) bit 506 and Speculative Load DPU Trap Enabled (SDMTE) bit 507 in PSW control register 505 and also the value in SpecLoad Return Zero register in DPU array 630 of DPU 525. DPU array 630 receives the upper bits of the effective address (i.e., EA31 through EA2).

The choice whether or not to initiate an exception may be determined as follows:
1. If the bit in the SpecLoad Return Zero register is set (i.e., Logic 1) for the memory region, then:
   A) If SLMTE bit 506 is Logic 1 and a misaligned access occurs, then an exception occurs as if it were a normal load;
   B) If SLMTE bit 506 is set to Logic 1:
      i) zero is always returned as data; and
      ii) the SDMTE bit 507 (not shown) is ignored, hence no exception is taken even if permissions are violated.
2. If the bit in the SpecLoad Return Zero register is NOT set (i.e., Logic 0) for the memory region:
   A) If SLMTE bit 506 is set to Logic 1 and it is a misaligned access, then the misaligned exception occurs, as if it were a normal load.
   B) If SLMTE bit 506 is not set (i.e., Logic 0) and it is a misaligned access, then zero is returned as data and no misaligned exception occurs.
   C) If SLDTE bit 507 is set (i.e., Logic 1) and an exception is signaled (NOT MAPPED) from DPU 525 then a DPU exception occurs, as if it were a normal load.
   D) If SLDTE bit 507 is not set and an exception is signaled (NOT MAPPED) from DPU 525, then zero is returned as data, and no DPU exception occurs.
   E) In all other cases, the instruction completes as a normal load instruction, with the correct data.

Although the present invention has been described in detail, those skilled in the art should understand that they can make various changes, substitutions and alterations herein without departing from the spirit and scope of the invention in its broadest form.

What is claimed is:

1. A data processor comprising:
    an instruction execution pipeline comprising N processing stages capable of executing a load instruction;
    a status register capable of storing a modifiable configuration value, said modifiable configuration value having a first value indicating said data processor is capable of executing a misaligned access handling routine and a second value indicating said data processor is not capable of executing a misaligned access handling routine;
    a misalignment detection circuit capable of determining if said load instruction performs a misaligned access to a target address of said load instruction and, in response to a determination that said load instruction does perform a misaligned access, generating a misalignment flag;
    a data protection unit capable of determining if said load instruction access a restricted area of memory and, in response to a determination that said load instruction accesses a restricted area of memory, determining if said load instruction is speculative; and
    exception control circuitry capable of detecting said misalignment flag and in response thereto determining if said modifiable configuration value is equal to said first value, wherein said exception control circuitry is further capable of, in response to a determination that said load instruction is speculative, causing said data processor to dismiss said load instruction.

2. The data processor as set forth in claim 1 wherein said exception control circuitry, in response to a determination that said modifiable configuration value is equal to said first value, causes said data processor to execute said misaligned access handling routine.

3. The data processor as set forth in claim 1 wherein said exception control circuitry, in response to a determination that said modifiable configuration value is equal to said second value, determines if said load instruction is speculative.

4. The data processor as set forth in claim 1 wherein said exception control circuitry, in response to a determination that said load instruction is speculative, causes said data processor to dismiss said load instruction.

5. The data processor as set forth in claim 1 wherein said data protection unit, in response to a determination that said load instruction does access a restricted area of memory and in response to a determination that said load instruction is not speculative, causes said data processor to execute an exception handling routine.

6. A processing system comprising:

a data processor;

a memory coupled to said data processor;

a plurality of memory-mapped peripheral circuits coupled to said data processor for performing selected functions in association with said data processor, said data processor comprising:

an instruction execution pipeline comprising N processing stages capable of executing a load instruction;

a status register capable of storing a modifiable configuration value, said modifiable configuration value having a first value indicating said data processor is capable of executing a misaligned access handling routine and a second value indicating said data processor is not capable of executing a misaligned access handling routine;

a misalignment detection circuit capable of determining if said load instruction performs a misaligned access to a target address of said load instruction and, in response to a determination that said load instruction does perform a misaligned access, generating a misalignment flag;

a data protection unit capable of determining if said load instruction access a restricted area of memory and, in response to a determination that said load instruction accesses a restricted area of memory, determining if said load instruction is speculative; and exception control circuitry capable of detecting said misalignment flag and in response thereto determining if said modifiable configuration value is equal to said first value, wherein said exception control circuitry is further capable of, in response to a determination that said load instruction is speculative, causing said data processor to dismiss said load instruction.

7. The processing system as set forth in claim 6 wherein said exception control circuitry, in response to a determination that said modifiable configuration value is equal to said first value, causes said data processor to execute said misaligned access handling routine.

8. The processing system as set forth in claim 7 wherein said exception control circuitry, in response to a determination that said modifiable configuration value is equal to said second value, determines if said load instruction is speculative.

9. The processing system as set forth in claim 8 wherein said exception control circuitry, in response to a determination that said load instruction is speculative, causes said data processor to dismiss said load instruction.

10. The processing system as set forth in claim 6 wherein said data protection unit, in response to a determination that said load instruction does access a restricted area of memory and in response to a determination that said load instruction is not speculative, causes said data processor to execute an exception handling routine.

11. For use in a data processor comprising: 1) an instruction execution pipeline comprising N processing stages capable of executing a load instruction and 2) a status register capable of storing a modifiable configuration value, the modifiable configuration value having a first value indicating the data processor is capable of executing a misaligned access handling routine and a second value indicating the data processor is not capable of executing a misaligned access handling routine, a method of handling exceptions in the data processor comprising the steps of:

determining if said load instruction access a restricted area of memory;

in response to a determination that said load instruction accesses a restricted area of memory, determining if said load instruction is speculative;

in response to a determination that said load instruction accesses a restricted area of memory and is speculative, causing said data processor to dismiss said load instruction;

in response to a determination that said load instruction does not access a restricted area of memory, determining if the load instruction is performing a misaligned access to a target address of the load instruction;

in response to a determination that the load instruction is performing a misaligned access, generating a misalignment flag; and detecting the misalignment flag and in response thereto determining if the modifiable configuration value is equal to the first value.

12. The method as set forth in claim 11 further comprising the step of:

in response to a determination that the modifiable configuration value is equal to the first value, executing the misaligned access handling routine.

13. The method as set forth in claim 12 further comprising the step of:

in response to a determination that the modifiable configuration value is equal to the second value, determining if the load instruction is speculative.

14. The method as set forth in claim 13 further comprising the step of:

in response to a determination that the load instruction is speculative, causing the data processor to dismiss the load instruction.

15. A data processor comprising:

an instruction execution pipeline comprising N processing stages capable of executing a load instruction;

a first status register capable of storing a first modifiable configuration value, said first modifiable configuration value having a first value indicating said data processor is capable of executing an exception handling routine and a second value indicating said data processor is not capable of executing an exception handling routine;

a second status register capable of storing a second modifiable configuration value, said second modifiable configuration value having a first value indicating said load instruction accesses a first region of memory in which an exception cannot be initiated and a second value indicating said load instruction accesses a second region of memory in which an exception can be initiated, said first region of memory including a restricted area of memory or an unrestricted area of memory;

a data protection unit capable of receiving a target address of said load instruction and, in response thereto, setting said second modifiable configuration value to said first value or said second value; and exception control circuitry capable of determining if said load instruction is speculative, and in response to a determination that said load instruction is speculative, and further in response to a determination that said first modifiable configuration value is equal to said second value and said second modifiable configuration value is equal to said first value, causes said data processor to dismiss said load instruction.

16. The data processor as set forth in claim 15, further comprising:
a misalignment detection circuit capable of determining if said load instruction performs a misaligned access to the target address of said load instruction and, in response to a determination that said load instruction does perform a misaligned access, generating a misalignment flag, and wherein said exception control circuitry is capable of detecting said misalignment flag and in response thereto determining if said modifiable configuration value is equal to said first value.

17. The data processor as set forth in claim 16, wherein said exception handling routine is a misaligned access handling routine and wherein said exception control circuitry, in response to a determination that said modifiable configuration value is equal to said first value, causes said data processor to execute said misaligned access handling routine.

18. The data processor as set forth in claim 17 wherein said exception control circuitry, in response to a determination that said first modifiable configuration value is equal to said second value, and in response to a determination that said load instruction is speculative, causes said data processor to dismiss said load instruction.

19. The data processor as set forth in claim 18 wherein said data protection unit is further capable of determining if said load instruction accesses a restricted area of memory.

20. The data processor as set forth in claim 19 wherein said data protection unit, in response to a determination that said load instruction does access a restricted area of memory, and in response to a determination that said second modifiable configuration value is equal to said second value, causes said data processor to execute said exception handling routine.

21. The data processor as set forth in claim 20 wherein said exception control circuitry, in response to a determination that said load instruction is speculative, and in response to said data protection unit determining that said load instruction does access a restricted area of memory and said second modifiable configuration value is equal to said second value, causes said data processor to dismiss said load instruction.

* * * * *